United States Patent [19]

Shigenai et al.

[11] Patent Number: 5,796,696
[45] Date of Patent: Aug. 18, 1998

[54] CHASSIS WITH STRENGTHENING RIB HAVING STEPPED SECTION FOR RECORDING AND/OR REPRODUCING APPARATUS

[76] Inventors: Osamu Shigenai; Hideki Ishikawa, both of 1-7 Yukigaya, Otsuka-Cho, Ota-Ku, Tokyo, Japan

[21] Appl. No.: 379,427

[22] Filed: Jan. 27, 1995

[30] Foreign Application Priority Data

Feb. 3, 1994 [JP] Japan ............... 6-011812

[51] Int. Cl.⁶ ............... G11B 33/02; G11B 17/02
[52] U.S. Cl. ............... 369/75.1; 360/99.08
[58] Field of Search ............... 360/98.07, 99.02, 360/99.06, 99.08; 369/75.1

[56] References Cited

U.S. PATENT DOCUMENTS

| | | | |
|---|---|---|---|
| 4,734,815 | 3/1988 | Naganawa et al. | 360/128 |
| 5,151,832 | 9/1992 | Nagasawa | 360/85 |
| 5,303,102 | 4/1994 | Aruga et al. | 360/105 |

*Primary Examiner*—Robert S. Tupper
*Assistant Examiner*—George J. Letscher

[57] ABSTRACT

A recording and/or reproducing apparatus in which a recording medium contained in a holder is rotated and driven and a signal is read from or written to the recording medium. In the chassis employed as a base of the recording and/or reproducing apparatus, or in the holder for containing a recording medium, a strengthening rib having a stepped section is formed.

5 Claims, 11 Drawing Sheets

CHASSIS WITH STRENGTHENING RIB HAVING STEPPED SECTION FOR RECORDING AND/OR REPRODUCING APPARATUS

BACKGROUND OF THE INVENTION

1. Field of The Invention

This invention relates to a recording and/or reproducing apparatus such as a flexible disk drive apparatus.

2. Description of The Prior Art

For example, a flexible disk drive apparatus is known as a conventional recording and/or reproducing apparatus.

Such a flexible disk drive apparatus is primarily composed of a chassis to be used as a base, a holder for containing a recording medium, guide means consisting of a slide plate on which cam means for guiding this holder to a recording position or an ejecting position is formed, a lead screw to be used as transporting means, on which a feed groove is formed, a stepping motor for turning and driving this lead screw, a carriage which is loaded with a lower magnetic head to be used as a signal converter and has a follower pin to be used as engagement means engaged with the feed groove of the lead screw at an end thereof and can transport the magnetic head radially outward from and inward to the center of a recording medium, an arm provided with an upper magnetic head at an end thereof facing the lower magnetic head to be used as a second converter and to be fastened to the carriage at the other end thereof with screws, and a spindle motor for driving and rotating a hub, on which a recording medium is placed, about a spindle axis. Each of the aforementioned composing members are loaded on the chassis to be used as a base.

Meanwhile, the chassis of the conventional apparatus is die-cast in aluminum. However, with recent increase in demand for a thin and light apparatus, it has come to make a chassis by performing a press working of a metal plate. In case where an extremely thin steel plate is used for making a chassis and a holder in order to pursue a thin and light apparatus, deformations are apt to appear in the chassis and the holder. Thus, in such a case, it is necessary to form a strengthening rib in the apparatus.

Figure 14:
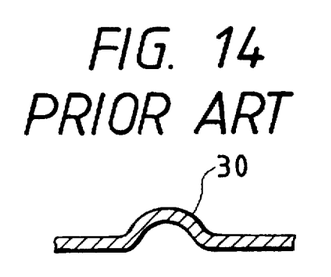
FIG. 14 is a sectional view of a rib of a conventional recording and/or reproducing apparatus.

Nevertheless, in the case of the conventional recording and/or reproducing apparatus, this rib is formed by performing a drawing or the like of a metal plate, so that the rib 30 is roundish in cross section and has a rise in a portion thereof to be made to come in contact with a tool for working, as illustrated in FIG. 14.

In the case of the conventional apparatus in which the rib having a section shaped like this is formed, distortions and deformations occurring at the time of processing a chassis and a holder make it difficult to achieve the processing with desired precision. Further, unnecessary deformations sometimes occur in the chassis and the holder. Thus, the conventional apparatus has encountered a problem that each of the composing members or components can not be fabricated with high precision owing to such deformations occurring in the chassis and the holder.

Furthermore, in view of the influence of the rib on a mounting portion of each of the other components, the rib should be placed away from the other composing parts in the apparatus. Therefore, the rib can not occupy a wide range in the apparatus. Consequently, it is difficult to ensure the sufficient strength of the chassis and the holder.

SUMMARY OF THE INVENTION

Accordingly, an object of the present invention is to provide a recording and/or reproducing apparatus which has a chassis and a holder that are hard to deform and is readily processed and is suitable for reducing the thickness and weight thereof.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Namely, flexible disk drive apparatuses embodying the recording and/or reproducing apparatus of the present invention will be described in detail hereinbelow with reference to the accompanying drawings.

Figure 1:
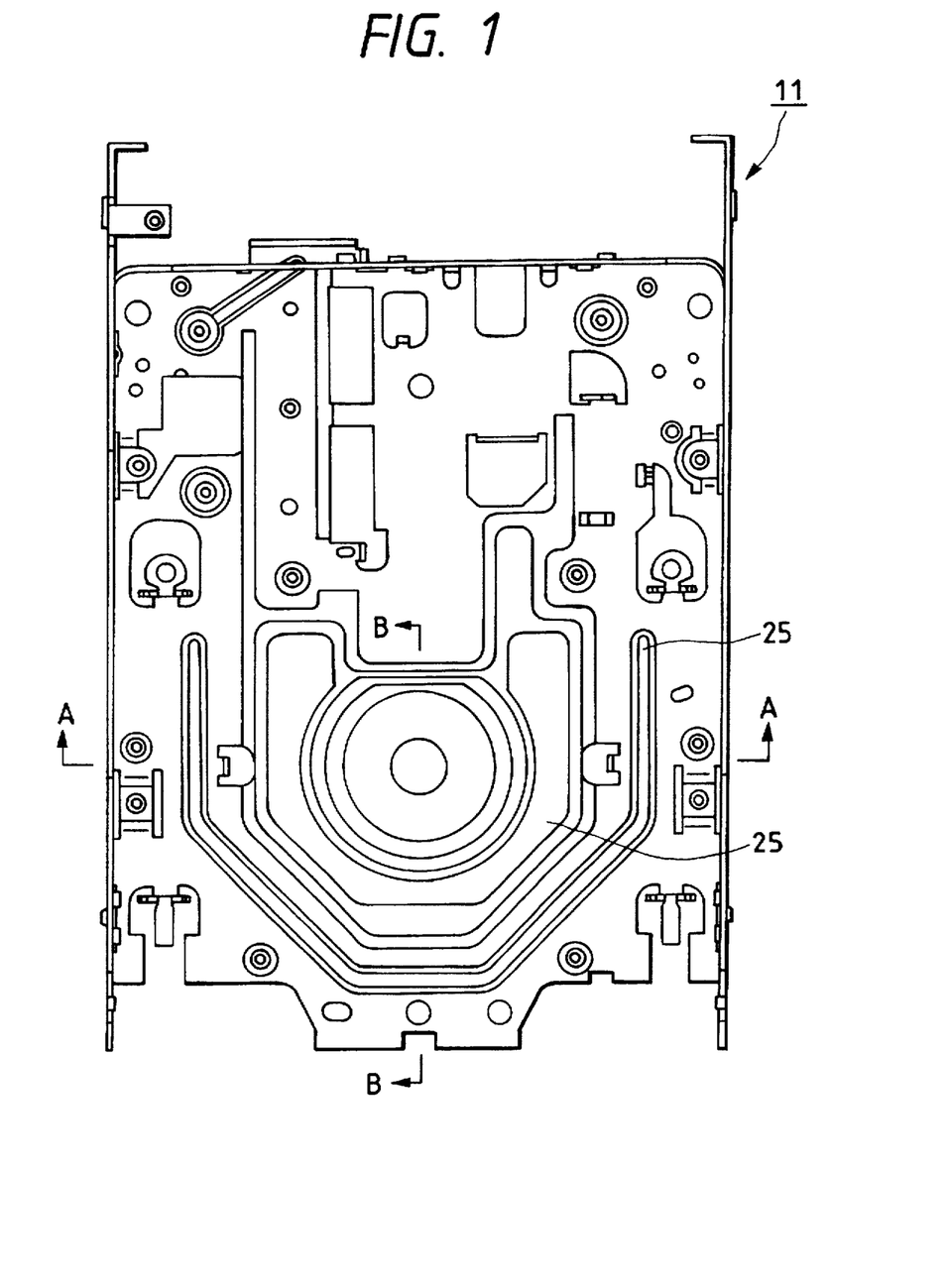
FIG. 1 is a plan view of a first embodiment of the present invention.
Figure 4:
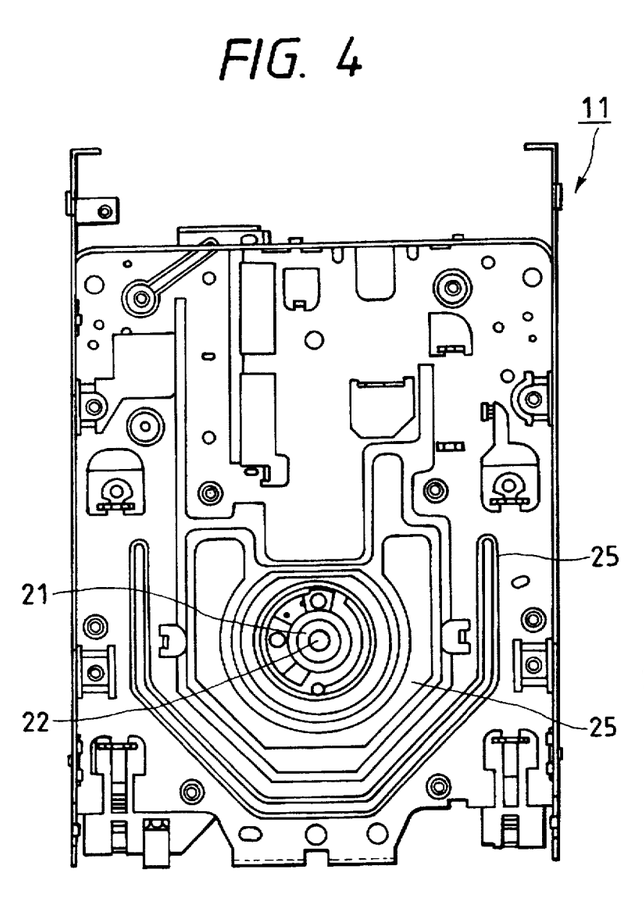
FIG. 4 is a plan view of a chassis in which a spindle motor is further incorporated in addition to the composing elements of FIG. 3(a)
Figure 5:
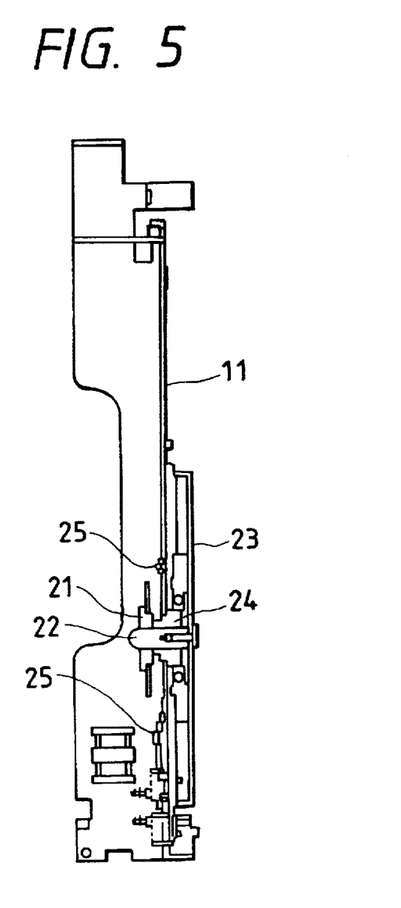
FIG. 5 is a sectional view of the chassis of FIG. 4.
Figure 6:
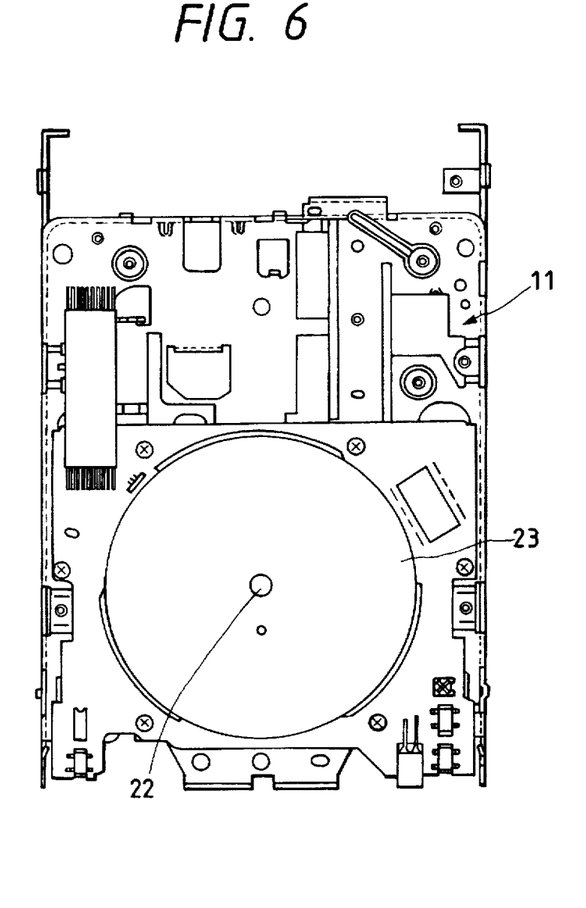
FIG. 6 is a bottom view of the chassis of FIG. 4.
Figure 7:
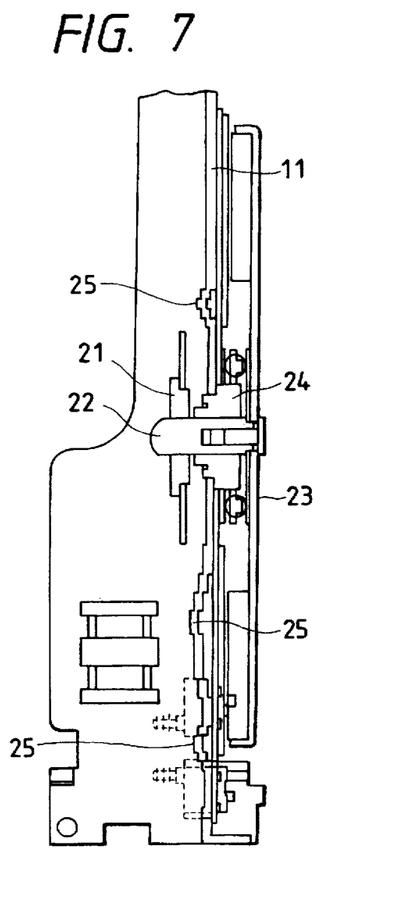
FIG. 7 is an enlarged sectional view of the chassis of FIG. 5.
Figure 8A:
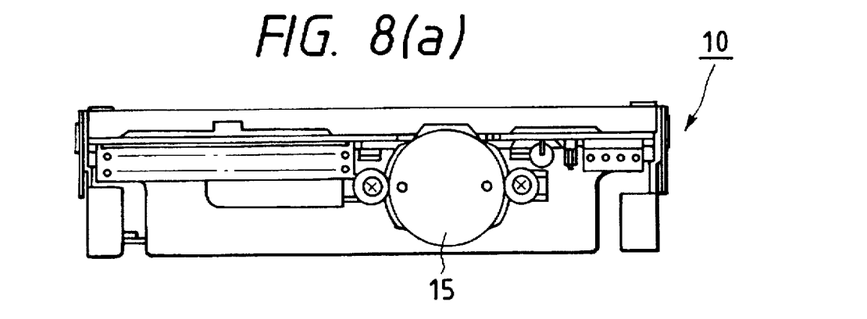
FIG. 8(a) is a front view of a chassis to which a slide plate, a carriage, a stepper, a control circuit and a lower cover are further mounted in addition to the composing elements of FIG. 4.
Figure 8B:
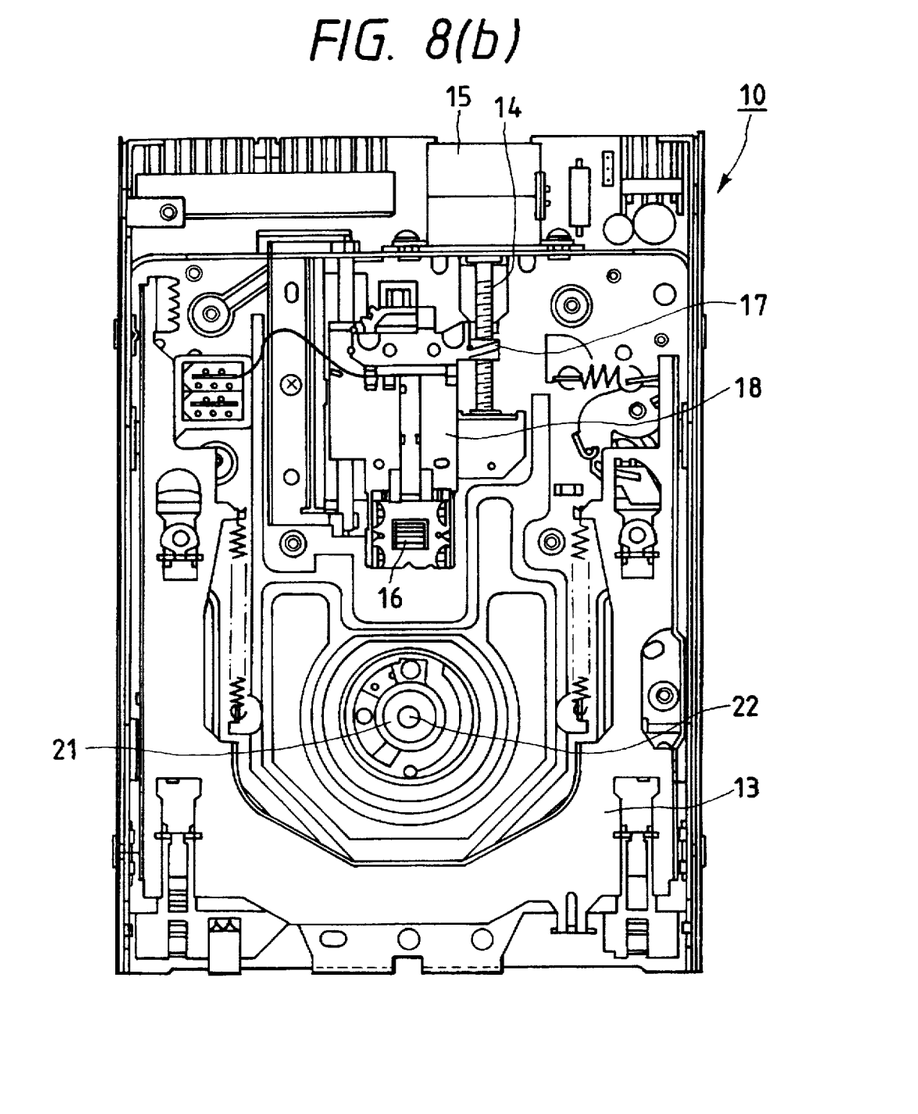
FIG. 8(b) is a plan view of the chassis of FIG. 8(a)
Figure 9:
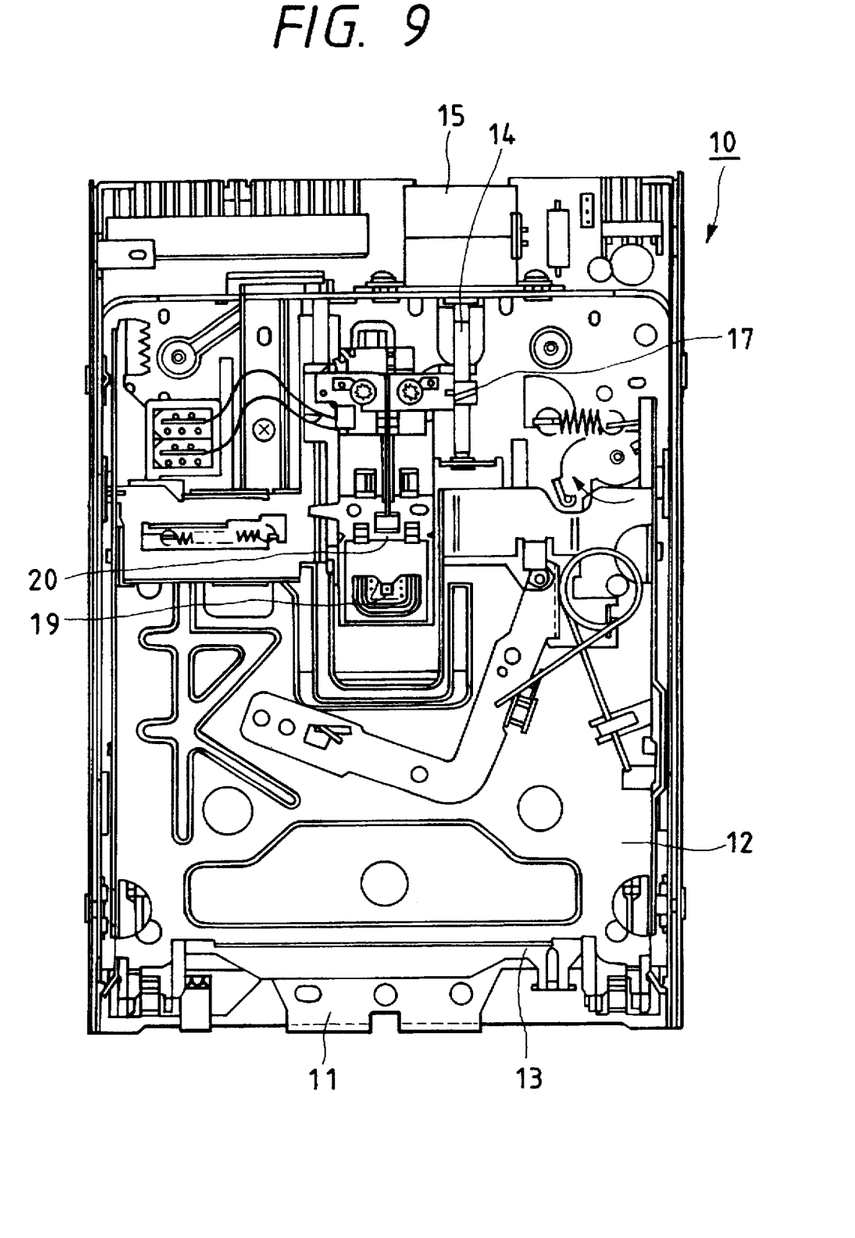
FIG. 9 is a plan view of a chassis in which an arm provided with an upper head, and a holder are incorporated in addition to the composing elements of FIG. 8(a)
Figure 10A:
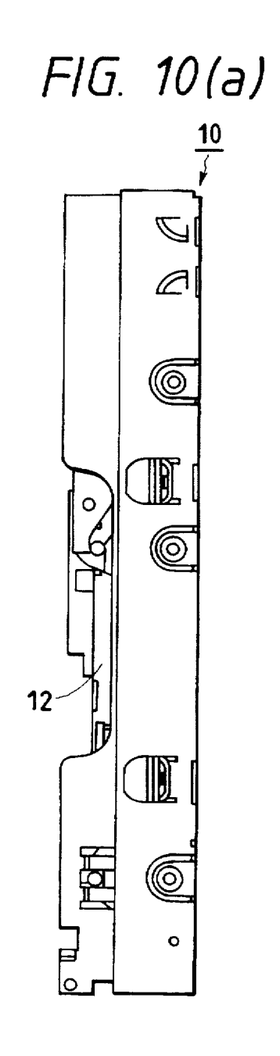
FIG. 10(a) is a side view of the chassis of FIG. 9.
Figure 10B:
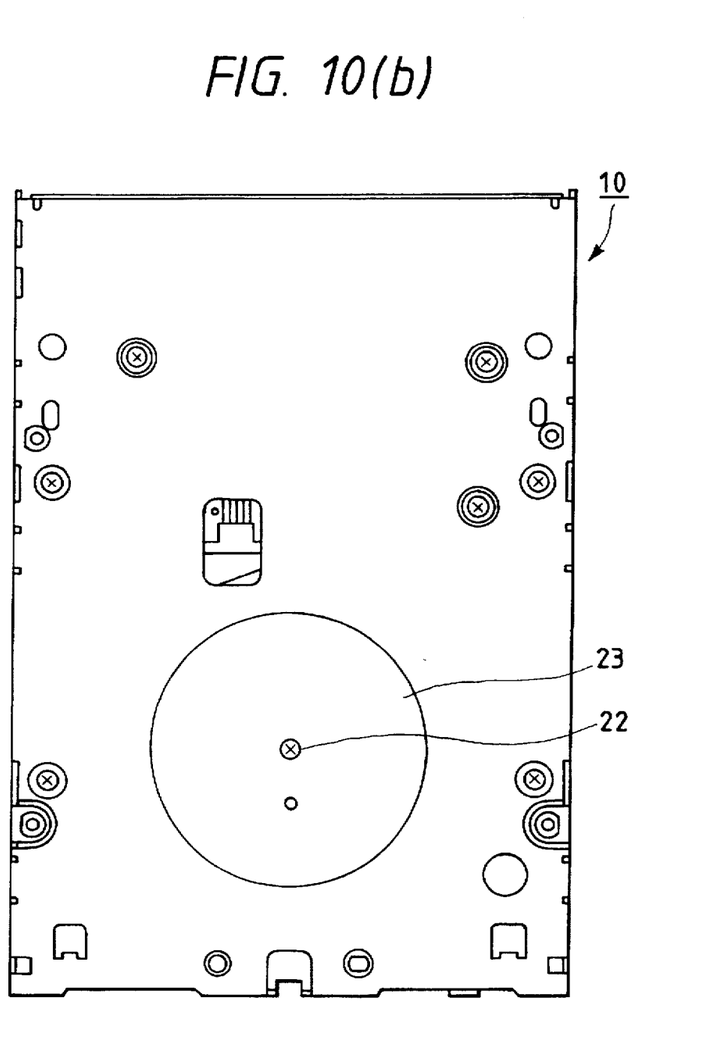
FIG. 10(b) is a bottom view of the chassis of FIG. 9.
Figure 11A:
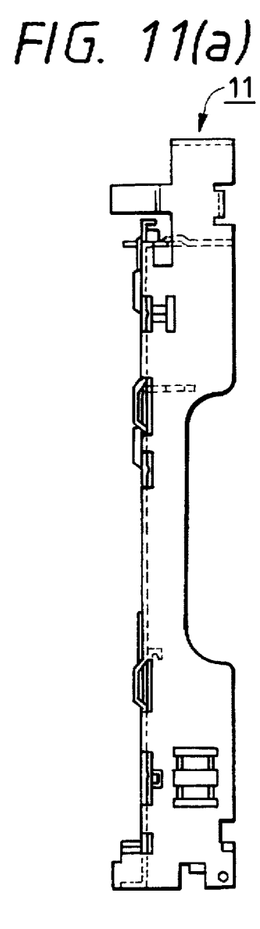
FIG. 11(a) is a side view of a chassis of a second embodiment of the present invention.
Figure 11B:
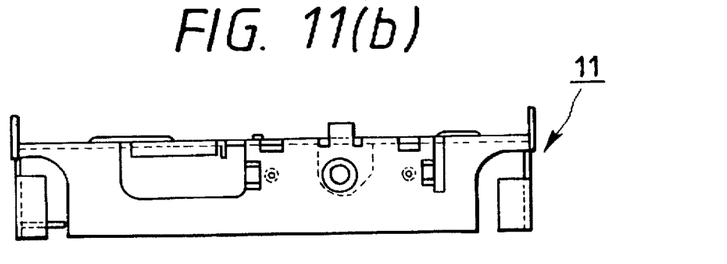
FIG. 11(b) is a rear view of the chassis of FIG. 11(a)
Figure 11C:
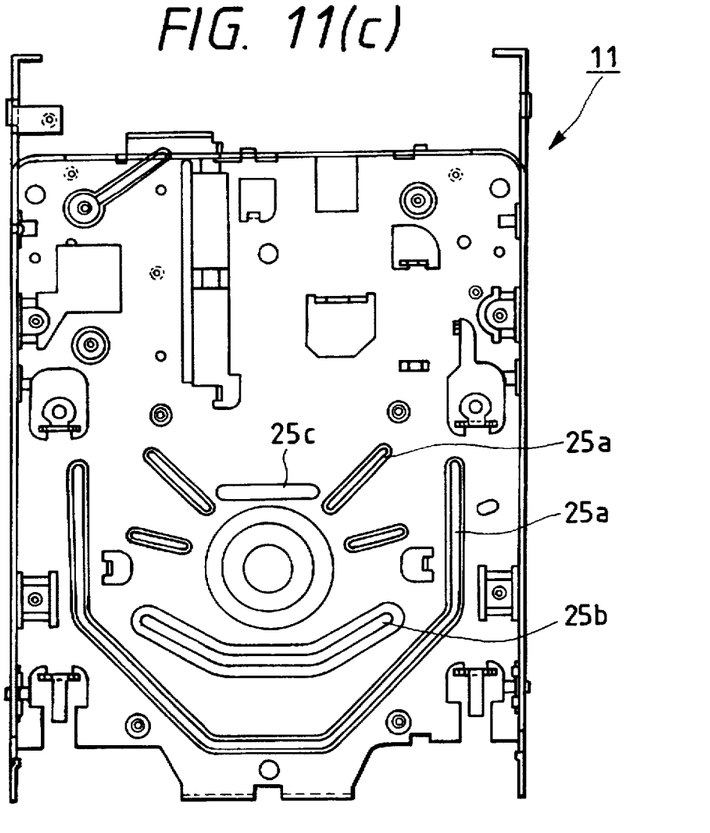
FIG. 11(c) is a plan view of the chassis of FIG. 11(a)
Figure 11D:
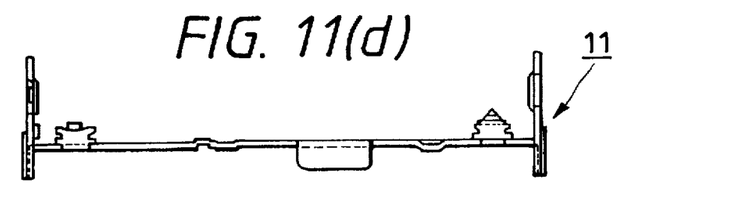
FIG. 11(d) is a front view of the chassis of FIG. 11(a)
Figures 12A, 12B:
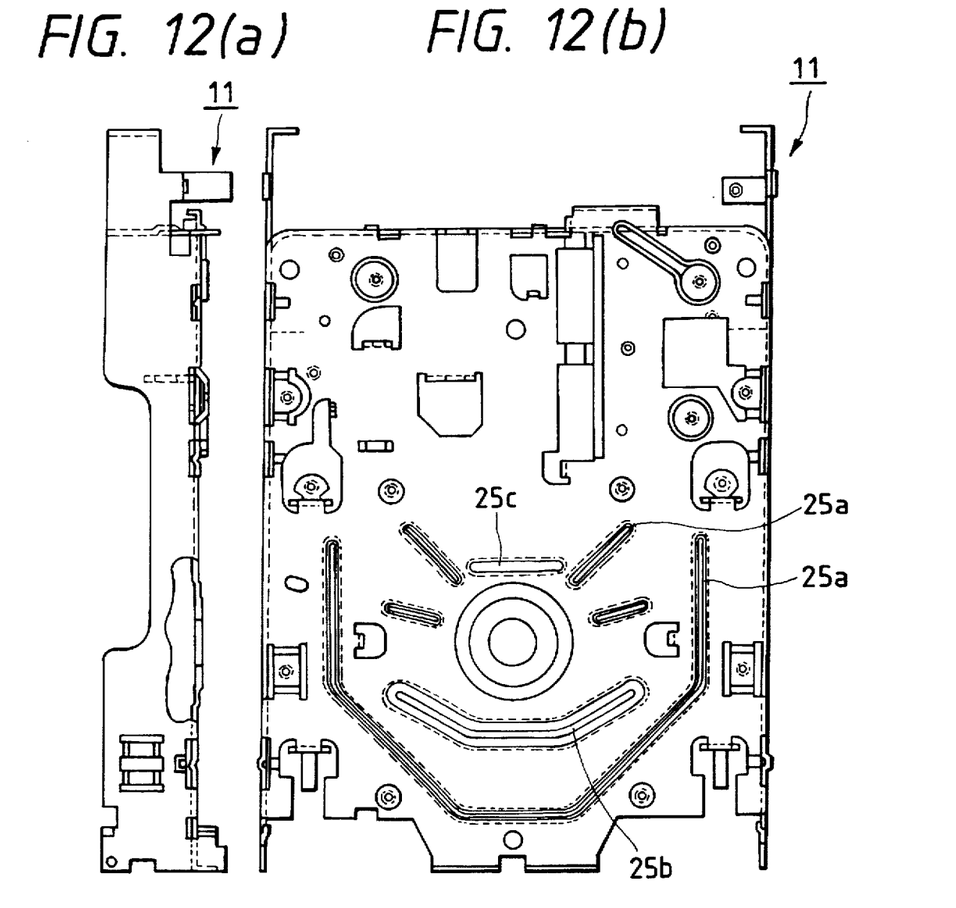
FIG. 12(a) is a side view of the chassis of FIG. 11(a)
FIG. 12(b) is a bottom view of the chassis of FIG. 11(a)

FIGS. 1 to 10 are diagrams for illustrating a first embodiment of the present invention. FIG. 1 is a plan view of the first embodiment of the present invention. FIGS. 2(a), 2(b), 2(c) and 2(d) are a sectional view taken on line A—A of FIG. 1, an enlarged view of a supporting means portion of a chassis, a sectional view taken on line B—B of FIG. 1 and an enlarged view of a primary part of the first embodiment, respectively. FIGS. 3(a) and 3(b) are a plan view and a side view of a chassis to which a bearing is mounted in addition to the composing elements of FIG. 1, respectively. FIG. 4 is a plan view of a chassis in which a spindle motor is further incorporated in addition to the composing elements of FIG. 3(a). FIG. 5 is a sectional view of the chassis of FIG. 4. FIG. 6 is a bottom view of the chassis of FIG. 4. FIG. 7 is an enlarged sectional view of the chassis of FIG. 5. FIGS. 8(a) and 8(b) are a front view and a plan view of a chassis to which a slide plate, a carriage, a stepper, a control circuit and a lower cover are further mounted in addition to the composing elements of FIG. 4. FIG. 9 is a plan view of the chassis of FIG. 8(a) in which an arm provided with an upper head, and a holder are incorporated in addition to the composing elements of FIG. 8(a). FIGS. 10(a) and 10(b) are a side view and a bottom view of the chassis of FIG. 9, respectively.

As shown in these figures, a flexible disk drive apparatus 10 is primarily composed of a chassis 11 to be used as a base, a holder 12 for containing a recording medium, guide means 13 consisting of a slide plate on which cam means for guiding this holder 12 to a recording position or an ejecting position is formed, a lead screw 14 to be used as transporting means, on which is a feed groove is formed, a stepping motor 15 for turning and driving this lead screw 14, a carriage 18 which is loaded with a lower magnetic head 16 to be used as a signal converter and has a follower pin 17 to be used as engagement means engaged with the feed groove of the lead screw 14 at an end thereof and can transport the magnetic head 16 radially outward from and inward to the center of a recording medium, an arm 20 provided with an upper magnetic head 19 at an end thereof facing the lower magnetic head 16 to be used as a second converter and to be fastened to the carriage 18 at the other end thereof with screws, and a spindle motor 23 for driving and rotating a hub 21, on which a recording medium is placed, about a spindle axis 22. Each of the composing members described hereinabove are loaded on the chassis 11 to be used as a base.

Further, supporting means 24 for supporting the spindle axis 22 in such a manner to be rotatable, which is made of, for example, an oil impregnated metal, is fitted to the chassis 11 of the recording and/or reproducing apparatus by performing a caulking or the like.

Figure 2A:
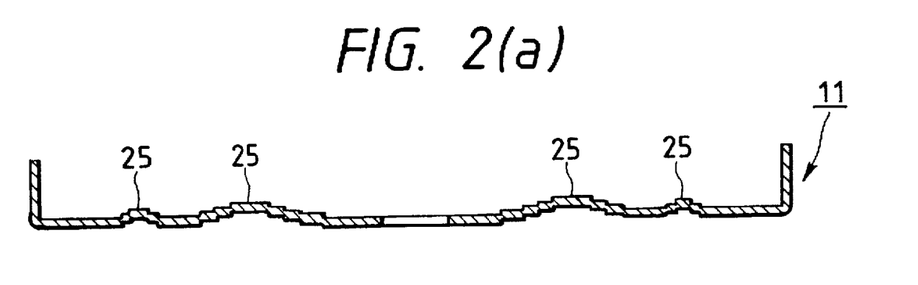
FIG. 2(a) is a sectional view taken on line A—A of FIG. 1.
Figure 2B:
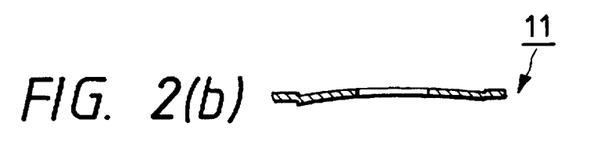
FIG. 2(b) is an enlarged view of a supporting means portion of a chassis.
Figure 2C:
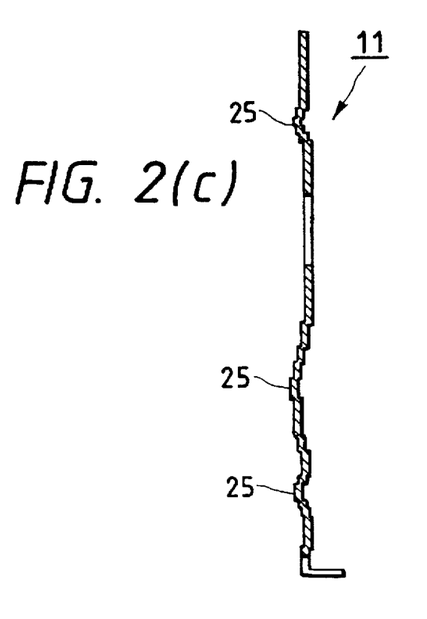
FIG. 2(c) is a sectional view taken on line B—B of FIG. 1.
Figure 2D:
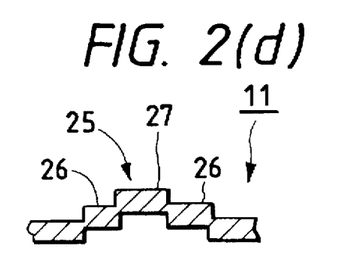
FIG. 2(d) is an enlarged view of a primary part of the first embodiment of FIG. 1.
Figure 3A:
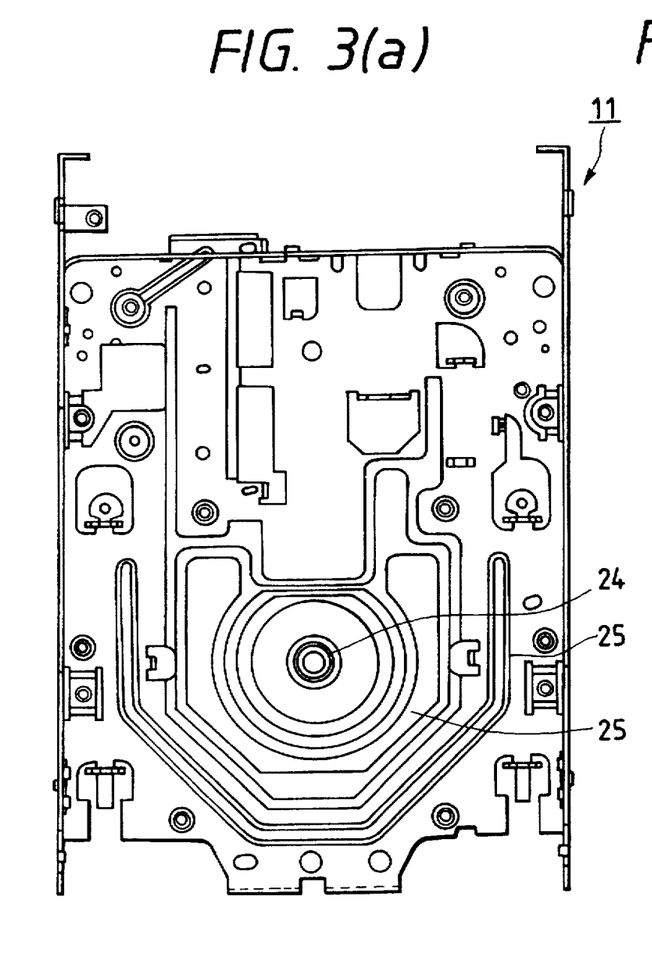
FIG. 3(a) is a plan view of a chassis to which a bearing is mounted in addition to the composing elements of FIG. 1.
Figure 3B:
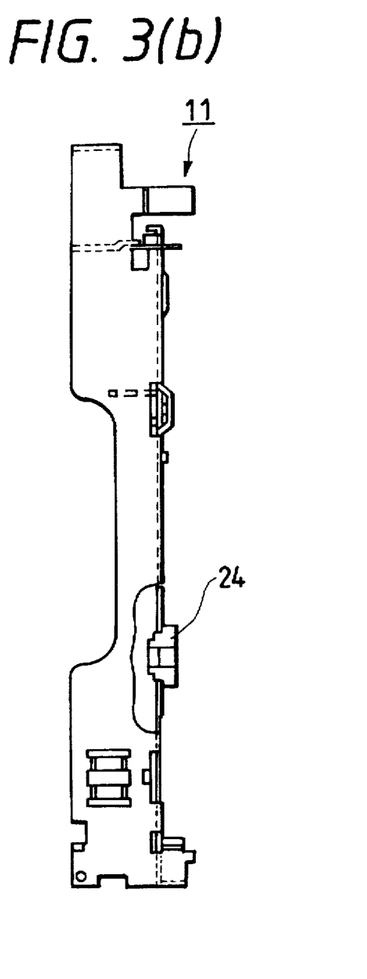
FIG. 3(b) is a side view of the chassis of FIG. 3(a)

Reference numeral 25 designates a strengthening rib formed in such a fashion to surround this supporting means 24. In this rib 25, a first protruding portion 26, the section of which is step-shaped as illustrated in FIG. 2(d), is formed. Further, on the inner side of this first protruding portion 26, a second protruding portion 27 protruding therefrom in the same direction as in the case of the first protruding portion 26 is formed in such a manner that the section thereof is step-shaped.

When forming such a rib 25, first, a part of a metal plate is pressed by using a half punch in such a manner that the pressed part protrudes. Subsequently, an inner side portion of the protruding part of the metal plate is further pressed so that the pressed portion protrudes and has a stepped section. Because the rib 25 is formed in this way by pressing a metal plate in such a manner that a pressed part protrudes and has a stepped section, unnecessary distortion does not occur when processing the rib 25. As a result, the rib 25 can be formed in the chassis 11 and the holder 12 with high precision.

Further, in comparison with the prior art apparatus, the rib 25 can occupy a wider range. Thus the strength of the chassis 11 and the holder 12 can be increased.

Moreover, in the case of this embodiment, the rib 25 can be easily formed in the chassis 11 and the holder 12 with high precision. Consequently, there can be provided a recording and/or reproducing apparatus which has a chassis and a holder that are hard to deform and is readily processed and is suitable for reducing the thickness and weight thereof.

Furthermore, in the case of this embodiment, the rib 25 is formed in the chassis 11 in such a manner to surround the supporting means 24 for supporting the spindle motor 23. Thereby, when processed, little distortion appears in the proximity of the supporting means 24. Further, the high-precision fabrication of the hub 21 and the spindle motor 23 can be achieved.

Figure 13A:
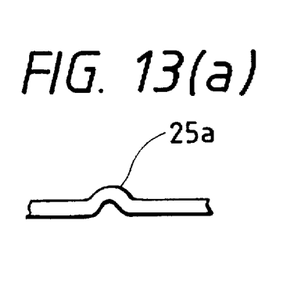
FIGS. 13(a), 13(b) and 13(c) are sectional views of ribs, respectively.
Figure 13B:
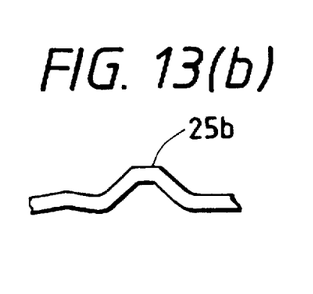
Figure 13C:
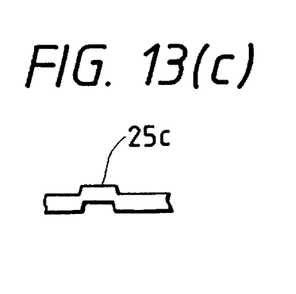

FIGS. 11(a) to 13(c) are diagrams for illustrating a second embodiment of the present invention. FIGS. 11(a), 11(b), 11(c) and 11(d) are a side view, a rear view, a plan view and a front view of the chassis of the second embodiment of the present invention, respectively. FIGS. 12(a) and 12(b) are a side view and a bottom view of the chassis of FIG. 11(a). FIGS. 13(a), 13(b) and 13(c) are sectional views of ribs, respectively. Incidentally, in these figures, like reference characters designate like or corresponding parts of the first embodiment. Further, the detailed description of such parts is omitted for simplicity of description.

In this second embodiment, a rib 25a of FIG. 13(a), a rib 25b of FIG. 13(b) or a rib 25c of FIG. 13(c) is formed.

In accordance with the second embodiment, there can be provided a recording and/or reproducing apparatus which comprises a chassis 11, a holder 12 for containing a recording medium, rotation drive means for rotating and driving a recording medium, guide means 13 for guiding this holder 12 to a recording position or an ejecting position and a converter for reading from and writing to a recording medium a signal, wherein at least one of the chassis 11 and the holder 12 has a strengthening rib 25 which protrudes therefrom and has a stepped section, whereby the chassis and the holder are hard to deform and the recording and/or reproducing apparatus is readily processed and is suitable for reducing the thickness and weight thereof.

It is also to be noted that, since the strengthening rib 25 is so configured that the second protruding portion 27 is formed inside the first protruding portion, no useless strain is caused during formation of the rib 25. It is therefore possible to form ribs 25 on the chassis 11 and the holder 12 at high degree of precision.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A recording and/or reproducing apparatus comprising:
   a chassis including a first flat plate;
   a holder mounted on the chassis for containing a recording medium, the holder including a second flat plate;
   rotation drive means mounted on the chassis for rotating and driving the recording medium;

guide means mounted on the chassis for guiding the holder to one of a recording position and an ejecting position; and a head movably mounted on the chassis for reading from and writing to the recording medium, and a supporting portion mounted to the chassis for supporting the rotation drive means, wherein a continuous portion of the first plate is deformed to form a strengthening rib having a stepped section protruding from said first plate, the strengthening rib is formed in such a manner to at least partially surround the supporting portion, said stepped section including a plurality of continuous flat surfaces which are parallel to said first plate thereby allowing the strengthening rib to occupy a wider area and to increase the strength with less distortion in the chassis.

2. The recording and/or reproducing apparatus according to claim 1, wherein the strengthening rib includes a first protruding portion having a stepped section and also includes a second protruding portion which is formed on an inner side of the first protruding portion and has a stepped section.

3. A recording and/or reproducing apparatus comprising:

a chassis including a flat plate;

a supporting portion mounted to the chassis;

rotation drive means mounted on the supporting portion for rotating a recording medium;

a head movably mounted on the chassis for reading from and writing on the rotating recording medium, wherein a strengthening rib is formed from a continuous portion of the flat plate, the strengthening rib at least partially surrounding the-supporting portion the strengthening rib protruding from the flat plate and including a stepped section having plurality of continuous flat surfaces which are parallel to the flat plate, thereby allowing the strengthening rib to occupy a wider area, and to increase the strength with less distortion in the chassis.

4. The recording and/or reproducing apparatus according to claim 3, wherein the chassis includes a first strengthening rib at least partially surrounding the supporting portion, and a second strengthening rib formed between the first strengthening rib and the supporting portion, wherein each of the first and second strengthening ribs is formed from a continuous portion of the flat plate such that the first and second strengthening ribs protrude from the flat plate and respectively include stepped sections having flat surfaces which are parallel to the flat plate.

5. The recording and/or reproducing apparatus according to claim 3, wherein the strengthening rib includes first, second and third flat surfaces, the first and second flat surfaces being located in a first plane which is parallel to the flat plate, the third surface being formed on a portion of the plate connected between the first and second flat surfaces.

* * * * *

UNITED STATES PATENT AND TRADEMARK OFFICE
CERTIFICATE OF CORRECTION

PATENT NO.    : 5,796,696
DATED         : August 18, 1998
INVENTOR(S)   : Shigenai et al.

It is certified that error appears in the above-indentified patent and that said Letters Patent is hereby corrected as shown below:

On the title page:

In column 1, after line 7, insert --Assignee: Alps Electric Co., Ltd. & Copal Precision Parts Corporation Limited--.

Signed and Sealed this

Seventh Day of September, 1999

Attest:

Q. TODD DICKINSON

Attesting Officer

Acting Commissioner of Patents and Trademarks